(12) United States Patent
Takeda et al.

(10) Patent No.: US 11,502,775 B2
(45) Date of Patent: Nov. 15, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/757,087

(22) PCT Filed: Oct. 19, 2017

(86) PCT No.: PCT/JP2017/037903
§ 371 (c)(1),
(2) Date: Apr. 17, 2020

(87) PCT Pub. No.: WO2019/077727
PCT Pub. Date: Apr. 25, 2019

(65) Prior Publication Data
US 2020/0244390 A1  Jul. 30, 2020

(51) Int. Cl.
*H04L 1/00* (2006.01)
*H04L 1/18* (2006.01)
(Continued)

(52) U.S. Cl.
CPC ............ *H04L 1/0013* (2013.01); *H04L 1/003* (2013.01); *H04L 1/1819* (2013.01);
(Continued)

(58) Field of Classification Search
CPC ..... H04L 1/0013; H04L 1/003; H04L 1/1819; H04L 5/0055; H04L 1/1861;
(Continued)

(56) References Cited

U.S. PATENT DOCUMENTS

2016/0295573 A1* 10/2016 Lee ..................... H04L 1/1812
2018/0255566 A1   9/2018 Takeda et al.
(Continued)

FOREIGN PATENT DOCUMENTS

JP     2017092614 A    5/2017
WO   2017/078147 A1   5/2017
(Continued)

OTHER PUBLICATIONS

3GPP TS 36.213 V14.4.0 (Sep. 2017), 6 pages (Year: 2017).*
(Continued)

*Primary Examiner* — Sharmin Chowdhury
(74) *Attorney, Agent, or Firm* — Osha Bergman Watanabe & Burton LLP

(57) ABSTRACT

A user terminal according to the present invention includes: a reception section that receives each of information indicating a code rate for a first uplink control channel, and information indicating a code rate for a second uplink control channel having a longer duration than that of the first uplink control channel; and a control section that controls transmission of Uplink Control Information (UCI) based on a code rate indicated by the information matching an uplink control channel used for the transmission of the uplink control information.

15 Claims, 13 Drawing Sheets

| GIVEN VALUE | CODE RATE $r_{short}$ FOR SHORT PUCCH | CODE RATE $r_{long}$ FOR LONG PUCCH |
|---|---|---|
| 0 | $r_{short}0$ | $r_{long}0$ |
| 1 | $r_{short}1$ | $r_{long}1$ |
| 2 | $r_{shotr}2$ | $r_{long}2$ |
| 3 | $r_{short}3$ | $r_{long}3$ |
| 4 | reserved | $r_{long}4$ |
| 5 | reserved | $r_{long}5$ |
| 6 | reserved | $r_{long}6$ |
| 7 | reserved | $r_{long}7$ |

(51) Int. Cl.
*H04L 5/00* (2006.01)
*H04W 72/04* (2009.01)
*H04W 80/08* (2009.01)

(52) U.S. Cl.
CPC ....... *H04L 5/0055* (2013.01); *H04W 72/0413* (2013.01); *H04W 80/08* (2013.01)

(58) Field of Classification Search
CPC ..... H04L 1/0023; H04L 5/0057; H04L 27/26; H04W 72/0413; H04W 80/08
See application file for complete search history.

(56) References Cited

U.S. PATENT DOCUMENTS

| | | | |
|---|---|---|---|
| 2018/0332576 | A1 | 11/2018 | Oh et al. |
| 2019/0074935 | A1* | 3/2019 | Babaei .................. H04L 1/1812 |
| 2019/0173549 | A1* | 6/2019 | Liang .................. H04B 7/0658 |
| 2019/0215826 | A1* | 7/2019 | Baldemair ........ H04W 72/0413 |
| 2020/0163112 | A1 | 5/2020 | Lee et al. |
| 2020/0280980 | A1* | 9/2020 | Myung .................. H04L 5/0053 |

FOREIGN PATENT DOCUMENTS

| | | |
|---|---|---|
| WO | 2017/078326 A1 | 5/2017 |
| WO | 2017/078425 A1 | 5/2017 |
| WO | 2017/173177 A1 | 10/2017 |

OTHER PUBLICATIONS

Extended European Search Report issued in counterpart European Patent Application No. 17929381.6, dated May 7, 2021 (10 pages).
Ericsson; "Summary of the E-mail Discussion [89-21]: On Long PUCCH for NR"; TSG-RAN WG1 NR AH Meeting #2, R1-1711677; Qingdao, China; Jun. 27-30, 2017 (25 pages).
NTT Docomo, Inc.; "Remaining details for multi-cell P-CSI transmission"; 3GPP TSG RAN WG1 Meeting #83, R1-157230; Anaheim, USA; Nov. 15-22, 2015 (4 pages).
International Search Report issued in PCT/JP2017/037903 dated Jan. 16, 2018 (1 page).
Written Opinion of the International Searching Authority issued in PCT/JP2017/037737 dated Jan. 16, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #84; R1-161064 "Code rate for periodic CSI transmission on PUCCH format 4 and 5" Ericsson; St Julian's, Malta; Feb. 15-19, 2016 (3 pages).
3GPP TSG RAN WG1 Meeting 90bis; R1-1717490 "Design of short-PUCCH for UCI of more than 2 bits" vivo; Prague, CZ; Oct. 9-13, 2017 (4 pages).
3GPP TSG RAN WG1 #90bis; R1-1718305 "On remaining details of short PUCCH for UCI of more than 2 bits" Nokia, Nokia Shanghai Bell; Prague, Czech Republic; Oct. 9-13, 2017 (4 pages).
3GPP TSG RAN WG1 #90bis; R1-1718308 "On the remaining details of long PUCCH for UCI more than 2 bits" Nokia, Nokia Shanghai Bell; Prague, Czech Republic; Oct. 9-13, 2017 (11 pages).
Office Action issued in Japanese Application No. 2019-549072; dated Jan. 5, 2022 (6 pages).
Office Action issued in Indian Application No. 202037019344 dated Apr. 22, 2022 (7 pages).
Office Action in counterpart Japanese Patent Application No. 2019-549072 dated Aug. 2, 2022 (6 pages).
Catt; "Further details of the long PUCCH structure"; 3GPP TSG RAN WG1 Meeting #88, R1-1702098; Athens, Greece; Feb. 13-17, 2017 (3 pages).
Intel Corporation; "Resource allocation for PUCCH"; 3GPP TSG RAN WG1 Meeting #90bis, R1-1717389; Prague, CZ; Oct. 9-13, 2017 (6 pages).

* cited by examiner

| VALUE OF maximumPayloadCoderate-r 13 | CODE RATE r |
|---|---|
| 0 | 0.08 |
| 1 | 0.15 |
| 2 | 0.25 |
| 3 | 0.35 |
| 4 | 0.45 |
| 5 | 0.60 |
| 6 | 0.80 |
| 7 | Reserved |

FIG. 1

| PUCCH FORMAT | NUMBER OF SYMBOLS IN SLOT | NUMBER OF BITS | Pre-DFT OCC |
|---|---|---|---|
| 0 | 1-2 | ≤2 | N.A. |
| 1 | 4-14 | ≤2 | N.A. |
| 2 | 1-2 | >2 | N.A. |
| 3 | 4-14 | >2 | No |
| 4 | 4-14 | >2 | Yes |

FIG. 3

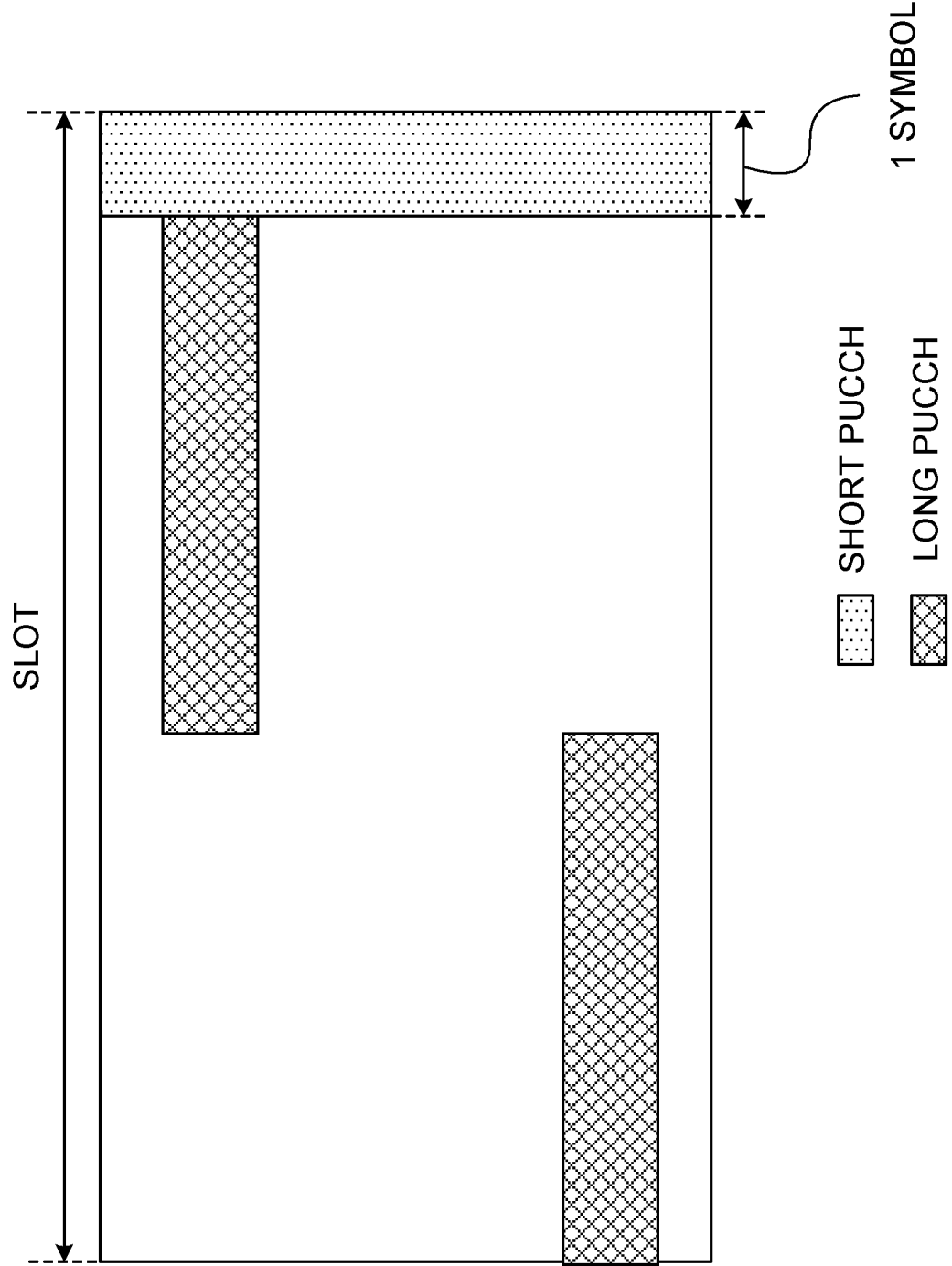

FIG. 5A

| GIVEN VALUE | CODE RATE r |
|---|---|
| 0 | r0 |
| 1 | r1 |
| ... | ... |
| 7 | r7 |

FIG. 5B

| GIVEN VALUE | CODE RATE $r_{short}$ FOR SHORT PUCCH | CODE RATE $r_{long}$ FOR LONG PUCCH |
|---|---|---|
| 0 | $r_{short}0$ | $r_{long}0$ |
| 1 | $r_{short}1$ | $r_{long}1$ |
| ... | ... | ... |
| 7 | $r_{short}7$ | $r_{long}7$ |

| GIVEN VALUE | CODE RATE $r_{short}$ FOR SHORT PUCCH | CODE RATE $r_{long}$ FOR LONG PUCCH |
|---|---|---|
| 0 | $r_{short}0$ | $r_{long}0$ |
| 1 | $r_{short}1$ | $r_{long}1$ |
| 2 | $r_{short}2$ | $r_{long}2$ |
| 3 | $r_{short}3$ | $r_{long}3$ |
| 4 | reserved | $r_{long}4$ |
| 5 | reserved | $r_{long}5$ |
| 6 | reserved | $r_{long}6$ |
| 7 | reserved | $r_{long}7$ |

| GIVEN VALUE | CODE RATE $r_{short}$ FOR SHORT PUCCH |
|---|---|
| 0 | $r_{shor}0$ |
| 1 | $r_{shor}1$ |
| ... | ... |
| 7 | $r_{shor}7$ |

FIG. 7B

| GIVEN VALUE | CODE RATE $r_{long}$ FOR LONG PUCCH |
|---|---|
| 0 | $r_{long}0$ |
| 1 | $r_{long}1$ |
| ... | ... |
| 7 | $r_{long}7$ |

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE-Advanced (LTE-A), Future Radio Access (FRA), 4G, 5G, 5G+ (plus), New RAT (NR) or LTE Rel. 14, 15 or ~) have been also studied.

Legacy LTE systems (e.g., LTE Rel. 8 to 13) perform communication on Downlink (DL) and/or Uplink (UL) by using a subframe (also referred to as a Transmission Time Interval (TTI)) of 1 ms. The subframe is a transmission time unit of 1 channel-coded data packet, and is a processing unit such as scheduling, link adaptation or retransmission control (HARQ: Hybrid Automatic Repeat reQuest).

Furthermore, according to legacy LTE systems (e.g., LTE Rel. 8 to 13), a user terminal transmits Uplink Control Information (UCI) by using an uplink control channel (e.g., a PUCCH: Physical Uplink Control Channel) or an uplink data channel (e.g., a PUSCH: Physical Uplink Shared Channel). A configuration (format) of the uplink control channel is referred to as a PUCCH Format (PF).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Legacy LTE systems (e.g., LTE Rel. 13 and prior releases) support uplink control channels (e.g., LTE PUCCH formats 1 to 5) of a plurality of formats of an identical duration (e.g., 14 symbols in a case of general Cyclic Prefix (CP)). On the other hand, future radio communication systems (e.g., LTE Rel. 14, 15 and ~, 5G and NR) are assumed to support uplink control channels of a plurality of formats whose durations are at least different.

For example, it has been studied for the future radio communication systems to support a first uplink control channel (also referred to as a short PUCCH or NR PUCCH formats 0 and/or 2) of a relatively short duration (e.g., 1 to 2 symbols), and a second uplink control channel (also referred to as a long PUCCH or at least one of NR PUCCH formats 1, 3 and 4 below) having a longer duration (e.g., 4 to 14 symbols) than that of the first uplink control channel.

Thus, it is assumed that, when the uplink control channels of a plurality of formats whose durations are at least different are supported, transmission control of UCI in the legacy LTE systems (e.g., LTE Rel. 13 or prior releases) that support only a plurality of uplink control channels of the identical duration is not suitable.

The present invention has been made in light of this point, and one of objects of the present invention is to provide a user terminal and a radio communication method that can appropriately control transmission of UCI when uplink control channels of a plurality of formats whose durations are at least different are supported.

Solution to Problem

One aspect of a user terminal according to the present invention includes: a reception section that receives each of information indicating a code rate for a first uplink control channel, and information indicating a code rate for a second uplink control channel having a longer duration than that of the first uplink control channel; and a control section that controls transmission of Uplink Control Information (UCI) based on a code rate indicated by the information matching an uplink control channel used for the transmission of the uplink control information.

Advantageous Effects of Invention

According to the present invention, it is possible to appropriately control transmission of UCI when uplink control channels of a plurality of formats whose durations are at least different are supported.

BRIEF DESCRIPTION OF DRAWINGS

FIG. 1 is a diagram illustrating one example of a table that indicates code rates of a legacy LTE system.

FIG. 3 is a diagram illustrating one example of PUCCH formats of a future radio communication system.

FIG. 4 is a diagram illustrating a multiplexing example of a short PUCCH and a long PUCCH according to the present embodiment.

FIGS. 5A and 5B are diagrams illustrating one example of a table that indicates code rates according to the present embodiment.

FIG. 6 is a diagram illustrating another example of allocation of a second PUCCH resource according to a third aspect.

FIGS. 7A and 7B are diagrams illustrating one example of a table that indicates code rates according to the present embodiment.

DESCRIPTION OF EMBODIMENTS

Legacy LTE systems (LTE Rel. 13 or prior releases) support uplink control channels (e.g., PUCCHs) of a plurality of formats (e.g., LTE PUCCH formats (LTE PFs) 1 to 5) of an identical duration (e.g., 14 symbols in a case of general Cyclic Prefix (CP)).

In the legacy LTE systems, user terminals control transmission of UCI that uses a PUCCH based on a code rate (e.g., maximum code rate) configured to a higher layer. The PUCCH format is a format (LTE PF 5) that uses a format (LTE PF 4) that can configure one or more resource blocks (Physical Resource Blocks (PRBs)) and/or a spreading factor 2.

More specifically, the user terminal receives information (e.g., a value of maximumPayloadCoderate-r13) indicating the code rate by higher layer signaling. When the code rate of the UCI calculated by the user terminal itself exceeds a maximum code rate indicated by the information, the user terminal drops at least part of the UCI (e.g., one or more pieces of Channel State Information (CSI)) according to a given rule.

FIG. 1 is a diagram illustrating one example of a table that indicates code rates of the legacy LTE systems. In the table illustrated in FIG. 1, values of maximum PayloadCoderate-r13 and given code rates are associated. The user terminal obtains from the table illustrated in FIG. 1 the maximum code rate associated with the value of maximumPayload-Coderate-r13 notified by higher layer signaling, and controls transmission of the UCI based on the maximum code rate.

It has been studied for future radio communication systems (e.g., LTE Rel. 15 and ~, 5G and NR) to transmit UCI by using uplink control channels (e.g., PUCCHs) of a plurality of formats (e.g., NR PUCCH formats (NR PFs) that will be referred to simply as PUCCH formats) whose durations are at least different.

Figure 2A:
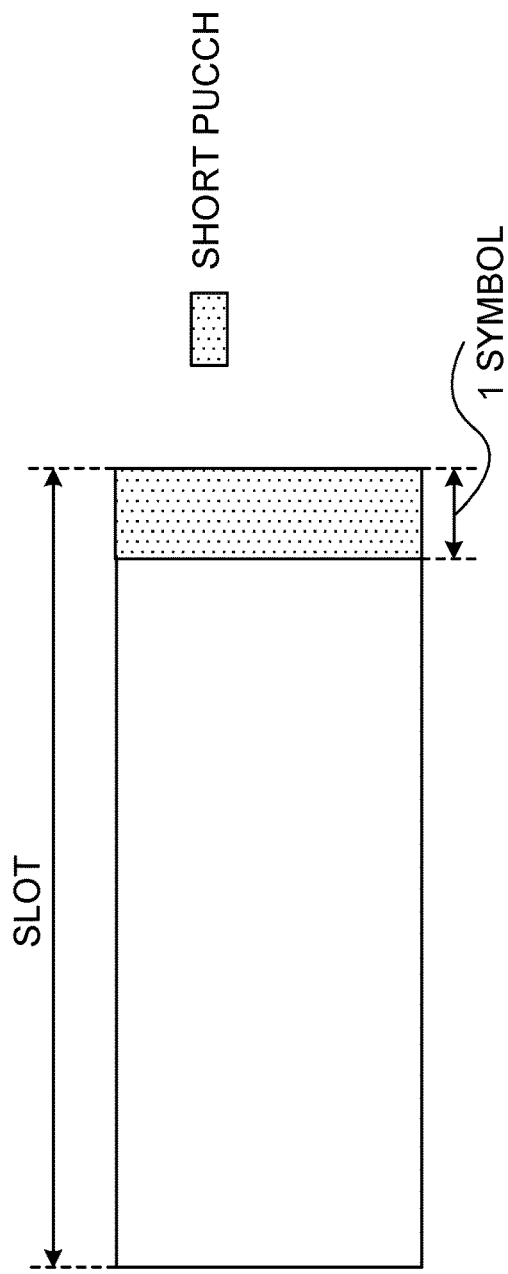
FIGS. 2A and 2B are diagrams illustrating configuration examples of uplink control channels.
Figure 2B:
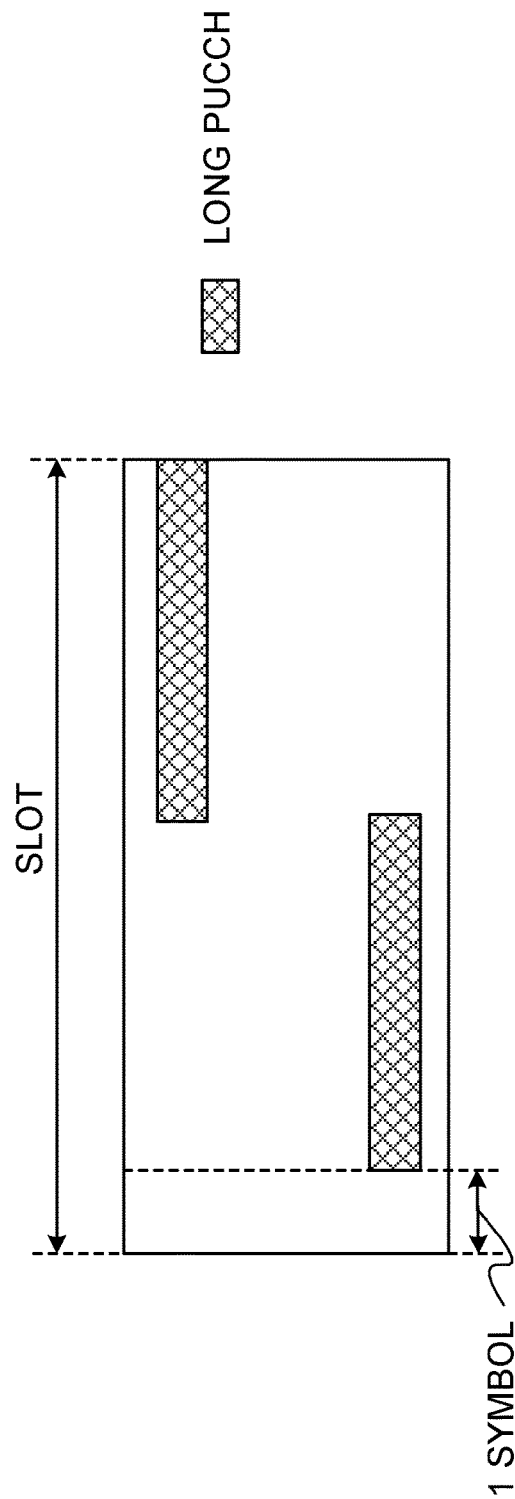

FIG. 2 is a diagram illustrating one example of PUCCHs in the future radio communication system. FIG. 2A illustrates the PUCCH (a short PUCCH or a first uplink control channel) including a relatively small number of symbols (a duration such as 1 to 2 symbols). FIG. 2B illustrates the PUCCH (a long PUCCH or a second uplink control channel) including a larger number of symbols (a duration such as 4 to 14 symbols) than that of the short PUCCH.

As illustrated in FIG. 2A, the short PUCCH may be arranged on a given number of symbols (e.g., 1 to 2 symbols) from a last of a slot. In addition, the arranged symbols of the short PUCCH are not limited to the last of the slot, and may be a given number of symbols at a start or a middle of the slot. Furthermore, the short PUCCH is arranged on one or more frequency resources (e.g., one or more PRBs). In addition, in FIG. 2A, the short PUCCH is arranged in contiguous PRBs, yet may be arranged in non-contiguous PRBs.

Furthermore, the short PUCCH may be subjected to time division multiplexing and/or frequency division multiplexing with an uplink data channel (also referred to as a PUSCH below) in a slot. Furthermore, the short PUCCH may be subjected to time division multiplexing and/or frequency division multiplexing with a downlink data channel (also referred to as a PDSCH below) and/or a downlink control channel (also referred to as a PDCCH: Physical Downlink Control Channel below) in the slot.

For the short PUCCH, a multicarrier waveform (e.g., Orthogonal Frequency Division Multiplexing (OFDM) waveform) may be used, or a single carrier waveform (e.g., a Discrete Fourier Transform-Spread-Orthogonal Frequency Division Multiplexing (DFT-s-OFDM) waveform) may be used.

On the other hand, as illustrated in FIG. 2B, a long PUCCH is arranged over the larger number of symbols (e.g., 4 to 14 symbols) than that of the short PUCCH. In FIG. 2B, the long PUCCH is not arranged on a given number of symbols at the start of the slot, yet may be arranged on a given number of symbols at the start of the slot.

As illustrated in FIG. 2B, the long PUCCH may include a smaller number of frequency resources (e.g., one or two PRBs) than that of the short PUCCH or may include an equal number of frequency resources to that of the short PUCCH to obtain a power boosting effect.

Furthermore, the long PUCCH may be subjected to frequency division multiplexing with the PUSCH in the slot. Furthermore, the long PUCCH may be subjected to time division multiplexing with the PDSCH in the slot. Furthermore, the long PUCCH may be arranged in a slot identical to that of the short PUCCH. For the long PUCCH, the single carrier waveform (e.g., DFT-s-OFDM waveform) may be used, or a multicarrier waveform (e.g., OFDM waveform) may be used.

Furthermore, as illustrated in FIG. 2B, the long PUCCH may be applied frequency hopping per given duration (e.g., mini (sub) slot) in the slot. The frequency hopping may be performed at a timing (e.g., 7 symbols in a case of 14 symbols per slot) at which the number of symbols to be transmitted before and after frequency hopping becomes equal, or at a timing (e.g., 6 symbols of a first half and 8 symbols of a second half in a case of 14 symbols per slot) at which the number of symbols before and after frequency hopping becomes unequal.

FIG. 3 is a diagram illustrating one example of PUCCH formats of the future radio communication system. FIG. 3 illustrates a plurality of PUCCH formats (NR PUCCH formats) of different numbers of symbols and/or different numbers of bits of UCI. In addition, the PUCCH formats illustrated in FIG. 3 are only exemplary, and contents of PUCCH formats 0 to 4 are not limited to those illustrated in FIG. 3.

In, for example, FIG. 3, the PUCCH format 0 is a short PUCCH for UCI up to 2 bits (e.g., FIG. 2A), and will be also referred to as a sequence-based short PUCCH. The short PUCCH conveys the UCI (e.g., HARQ-ACK and/or an SR) up to 2 bits in 1 or 2 symbols.

The PUCCH format 1 is a long PUCCH for the UCI up to 2 bits (e.g., FIG. 2B). The long PUCCH conveys the UCI up to 2 bits in 4 to 14 symbols. According to the PUCCH format 1, a plurality of user terminals may be subjected to Code Division Multiplexing (CDM) in an identical PRB by time-domain block-wise spreading that uses, for example, a Cyclic Shift (CS) and/or an Orthogonal Cover Code (OCC).

The PUCCH format 2 is a short PUCCH for the UCI more than 2 bits (e.g., FIG. 2A). The short PUCCH conveys the UCI more than 2 bits in 1 or 2 symbols.

The PUCCH format 3 is a long PUCCH for the UCI more than 2 bits (e.g., FIG. 2B), and a plurality of user terminals can be multiplexed in an identical PRB. The long PUCCH conveys the UCI more than 2 bits in 4 to 14 symbols. According to the PUCCH format 3, a plurality of user terminals may be subjected to code division multiplexing in the identical PRB by the time-domain block-wise spreading that uses a CS and/or an OCC. Alternatively, a plurality of user terminals may be multiplexed by using at least one of (frequency-domain) block-wise spreading before Discrete Fourier Transform (DFT), Frequency Division Multiplexing (FDM) and a comb-shaped sub-carrier. Furthermore, the PUCCH format 3 may not be applied the OCC before DFT spreading.

The PUCCH format 4 is a long PUCCH for the UCI more than 2 bits (e.g., FIG. 2B), and a single user terminal is multiplexed in an identical PRB. The long PUCCH conveys the UCI more than 2 bits (or equal to or more than N bits). The PUCCH format 4 differs from the PUCCH format 3 in that a plurality of user terminals are not multiplexed in the identical PRB. Furthermore, the OCC may be applied to the PUCCH format 4 before DFT spreading.

Thus, the future radio communication systems (e.g., LTE Rel. 15 and ~, 5G and NR) are assumed to support a plurality of PUCCH formats (see FIG. 3) whose durations are at least different. On the other hand, as described above, the legacy LTE systems (e.g., LTE Rel. 13 and prior releases) support only a plurality of PUCCH formats of the identical duration.

Therefore, the future radio communication systems have a risk that, when transmission control of UCI is applied based on the same code rate as those of the legacy LTE systems, it is not possible to appropriately control transmission of the UCI that uses a plurality of PUCCH formats having different durations. More specifically, the short PUCCH and the long PUCCH have different performance, and therefore target maximum code rates should also differ. On the other hand, the legacy LTE systems have a risk that a radio base station can indicate only a single maximum code rate, and therefore when the short PUCCH and the long PUCCH are used, if transmission is performed based on the maximum code rate, the UCI cannot be appropriately controlled.

Hence, the inventors of this application have conceived appropriately controlling transmission of UCI that uses PUCCHs of a plurality of formats whose durations are at least different by notifying information (encoding information) independently indicating each code rate of PUCCHs (e.g., the long PUCCH and/or the short PUCCH) of a plurality of formats whose durations are at least different.

Hereinafter, the present embodiment will be described in detail. In the present embodiment, the "UCI" may include at least one of a Scheduling Request (SR), retransmission control information (HARQ-ACK: Hybrid Automatic Repeat reQuest-Acknowledge, ACK or NACK (Negative ACK)) for downlink data (downlink data channel (e.g., PDSCH: Physical Downlink Shared Channel)), Channel State Information (CSI) and beam related information (e.g., BI: Beam Index).

Furthermore, in the present embodiment, the "short PUCCH (first uplink control channel)" is a general term of the PUCCH formats 0 and 2 illustrated in FIG. 3, and the "long PUCCH (second uplink control channel)" is a general term of the PUCCH formats 1, 3 and 4 illustrated in FIG. 3. In addition, configurations of the short PUCCH and the long PUCCH are not limited to the PUCCH formats illustrated in FIG. 3, and may be changed, added or deleted as appropriate. Furthermore, numbers of the PUCCH formats respectively indicating the long PUCCH and the short PUCCH are not limited to those illustrated in FIG. 3, either.

(Transmission Control Based on Encoding Information)

In the present embodiment, the user terminal receives each of information (first encoding information) indicating a code rate for the short PUCCH, and information (second encoding information) indicating a code rate for the long PUCCH. For example, the first and second encoding information may be each information indicating maximum code rates for the short PUCCH and the long PUCCH. Furthermore, information indicating a code rate for a different long PUCCH may be able to be configured to a plurality of different channel configurations (e.g., PUCCH formats and the numbers of PRBs).

The user terminal may receive pieces of the first and/or second encoding information by higher layer signaling and/or physical layer signaling.

In this regard, the higher layer signaling may be signaling (e.g., Radio Resource Control (RRC) signaling) that is specific to each user terminal, and signaling (e.g., broadcast information (MIB: Master Information Block) and/or system information (an SIB: System Information Block and/or an RMSI: Remaining Minimum System Information)) that is common between one or more user terminals.

Furthermore, the physical layer signaling may be Downlink Control Information (DCI) that is specific to each user terminal, and DCI (e.g., group common DCI) that is common between one or more user terminals.

In the present embodiment, the user terminal controls transmission of UCI based on a code rate indicated by encoding information (e.g., the first encoding information in a case where the short PUCCH is used, and the second encoding information in a case where the long PUCCH is used) matching the PUCCH used for transmission of the UCI. Thus, the user terminal determines which encoding information to use by determining which PUCCH (PUCCH format) to use for transmission of the UCI.

FIG. 4 is a diagram illustrating a multiplexing example of the short PUCCH and the long PUCCH according to the present embodiment. As illustrated in FIG. 4, the short PUCCH and the long PUCCH may be subjected to Time Division Multiplexing (TDM) in an identical slot. In addition, the numbers of symbols and/or arrangement positions of the short PUCCH and the long PUCCH illustrated in FIG. 4 are only one example, and are not limited to those illustrated in FIG. 4.

Furthermore, the long PUCCH or the short PUCCH may be able to be configured/indicated as a PUCCH for transmitting specific UCI (an HARQ-ACK bit for DL data allocated in a specific CC or a specific slot, or a specific CSI process). In this case, the user terminal performs TDM transmission on the long PUCCH and the short PUCCH or transmits only one of the long PUCCH and the short PUCCH according to a type or a class of the UCI to be transmitted.

In FIG. 4, the user terminal may transmit the UCI by using the short PUCCH and/or the long PUCCH in the identical slot.

In addition, which PUCCH to use for transmission of the UCI may be defined by at least one of a UCI type (e.g., at least one of an SR, HARQ-ACK and CSI), a UCI payload (the number of bits), a use case (e.g., URLLC: Ultra Reliable and Low Latency Communications, an eMBB: enhanced Mobile Broad Band or eMTC: enhanced Machine Type Communication) and a delay tolerance. Furthermore, higher layer signaling may configure the PUCCH used for transmission of the UCI.

When the short PUCCH and the long PUCCH are subjected to time division multiplexing or one of the short PUCCH and the long PUCCH is selected as illustrated in FIG. 4, the user terminal may control dropping of at least part of the UCI (e.g., at least one of the CSI, the SR, the HARQ-ACK and the beam information) on one of the short PUCCH and the long PUCCH. On which one of the short PUCCH and the long PUCCH the dropping is controlled may be defined in advance or may be configured by higher layer signaling.

More specifically, as illustrated in FIG. 4, the user terminal may control dropping of the CSI included in the UCI on one of the short PUCCH and the long PUCCH. When, for example, a total information amount of the UCI including the CSI exceeds a given value on one of the short PUCCH and the long PUCCH, the user terminal may drop at least part of the CSI according to a given rule.

The given value may be calculated based on at least one of the code rate (e.g., maximum code rate) indicated by the first encoding information or the second encoding information, the number of bits of the UCI to be transmitted, and a spreading factor.

Furthermore, the given rule may be defined based on a priority of a reporting type (e.g., PUCCH reporting type) indicating information that needs to be reported. More specifically, the CSI includes at least one of a Channel Quality Indicator (CQI), a Precoding Matrix Identifier (PMI), a Rank Identifier (RI) and a Beam Index (BI). The reporting type may indicate at least one of the CQI, the PMI, the RI and the BI. Furthermore, the CQI may include a plurality of CQIs (e.g., a wide band CQI and a subband CQI) according to a bandwidth to be supported, and the CQIs of different bandwidths may be indicated by reporting types.

Furthermore, the given rule may be defined based on a priority of a cell (CC) of the CSI. When, for example, CSI has a smaller cell index, a higher priority may be configured. Furthermore, according to the given rule, the priority of the CSI may be configured based on a frequency band (e.g., a licensed band or an unlicensed band). Thus, the given rule may be defined by at least one of the reporting type, the cell and a frequency bandwidth.

(Table Configuration)

In the present embodiment, the user terminal controls transmission of the UCI based on a code rate associated with information (a value equal to the first encoding information or the second encoding information) matching the PUCCH used for the transmission of the UCI in the table that associates given values and code rates. The given values (i.e., the first encoding information or the second encoding information) associated with the code rates in the table may be values of given fields in higher layer control information or DCI, values of given indices, values of Information Elements (IE) or values of given index information.

In this regard, the code rates associated with the given values in the table may be common or different between the short PUCCH and the long PUCCH. Furthermore, the table that associates the given values and the code rates and/or a size of the table may be common or different between the short PUCCH and the long PUCCH. A configuration example of the table according to the present embodiment will be described with reference to FIGS. 5 to 7.

FIG. 5 is a diagram illustrating one example of a table that indicates code rates according to the present embodiment. In the table illustrated in FIG. 5A, given values and code rates that are common between the short PUCCH and the long PUCCH are associated. The first encoding information and the second encoding information may indicate one of values illustrated in FIG. 5A.

When the code rate that is common between the short PUCCH and the long PUCCH is used as illustrated in FIG. 5A, the first encoding information and the second encoding information for the identical user terminal may indicate different code rates. For example, the first encoding information for the short PUCCH may indicate a higher code rate than that of the second encoding information for the long PUCCH.

In a table illustrated in FIG. 5B, given values and code rates of each of the short PUCCH and the long PUCCH are associated. Although FIG. 5B assumes a case where each of code rates $r_{short}0$ to $r_{short}7$ for the short PUCCH and code rates $r_{long}0$ to $r_{long}7$ for the long PUCCH associated with the given values is different, at least one of the code rates $r_{short}0$ to $r_{short}7$ and the code rates $r_{long}0$ to $r_{long}7$ are identical.

When, for example, the first encoding information and the second encoding information have equal values (e.g., "1")), the code rate $r_{short}1$ indicated by the first encoding information ("1"), and the code rate $r_{long}1$ indicated by the second encoding information ("1") may be different.

FIG. 6 is a diagram illustrating another example of a table that indicates code rates according to the present embodiment. As illustrated in FIG. 6, a size (e.g., 4 records in FIG. 6) of a table that associates given values and code rates for the short PUCCH may be smaller than a size (e.g., 8 records in FIG. 6) of a table that associates the given values and code rates for the long PUCCH.

FIG. 7 is a diagram illustrating still another example of a table that indicates code rates according to the present embodiment. FIG. 7A illustrates a table that associates the given values indicated by the first encoding information, and code rates for the short PUCCH. On the other hand, FIG. 7B illustrates the table that associates given values indicated by the second encoding information, and code rates for the long PUCCH.

As illustrated in FIGS. 7A and 7B, the table that indicates the code rates for the short PUCCH, and the table that indicates the code rates for the long PUCCH may be separately provided.

In addition, a relationship between the short PUCCH and the long PUCCH has been described above. However, a code rate (maximum code rate) used for transmission control of UCI and/or UL data may be different between the PUCCHs (the short PUCCH and/or the long PUCCH) and the PUSCH. The user terminal may receive information indicating the code rate of the PUSCH.

(CSI Process)

According to the present embodiment, each process (CSI process) and/or a resource (CSI resource) of CSI included in UCI may be associated with the short PUCCH or the long PUCCH by higher layer signaling.

In this regard, the CSI process is defined by a combination of a measurement resource of a desired signal (desired signal measurement resource) and a measurement resource of an interference signal (interference signal measurement resource). The desired signal measurement resource may be a CSI-RS resource according to LTE or may employ a CSI-RS-based resource configuration or another new resource configuration. The interference signal measurement resource may be a CSI-Interference Measurement (CSI-IM) resource according to LTE, or may employ a CSI-IM-based resource configuration or another new resource configuration.

In the present embodiment, one or more CSI processes are configured to the user terminal by higher layer signaling. The user terminal may receive information (CSI process information) that indicates the association between each CSI process and the short PUCCH or the long PUCCH. The user terminal may transmit the CSI of a corresponding CSI process by using the short PUCCH or the long PUCCH based on the CSI process information.

As described above, according to the present embodiment, the first and second encoding information indicating the code rate of each of the short PUCCH and the long PUCCH are independently notified to the user terminal, so that it is possible to appropriately control transmission of UCI even when the short PUCCH and the long PUCCH of different durations are supported.

(Radio Communication System)

The configuration of the radio communication system according to the present embodiment will be described below. This radio communication system is applied the radio communication method according to each of the above aspect. In addition, the radio communication method according to each of the above aspect may be each applied alone or may be applied by combining at least two of the radio communication methods.

Figure 8:
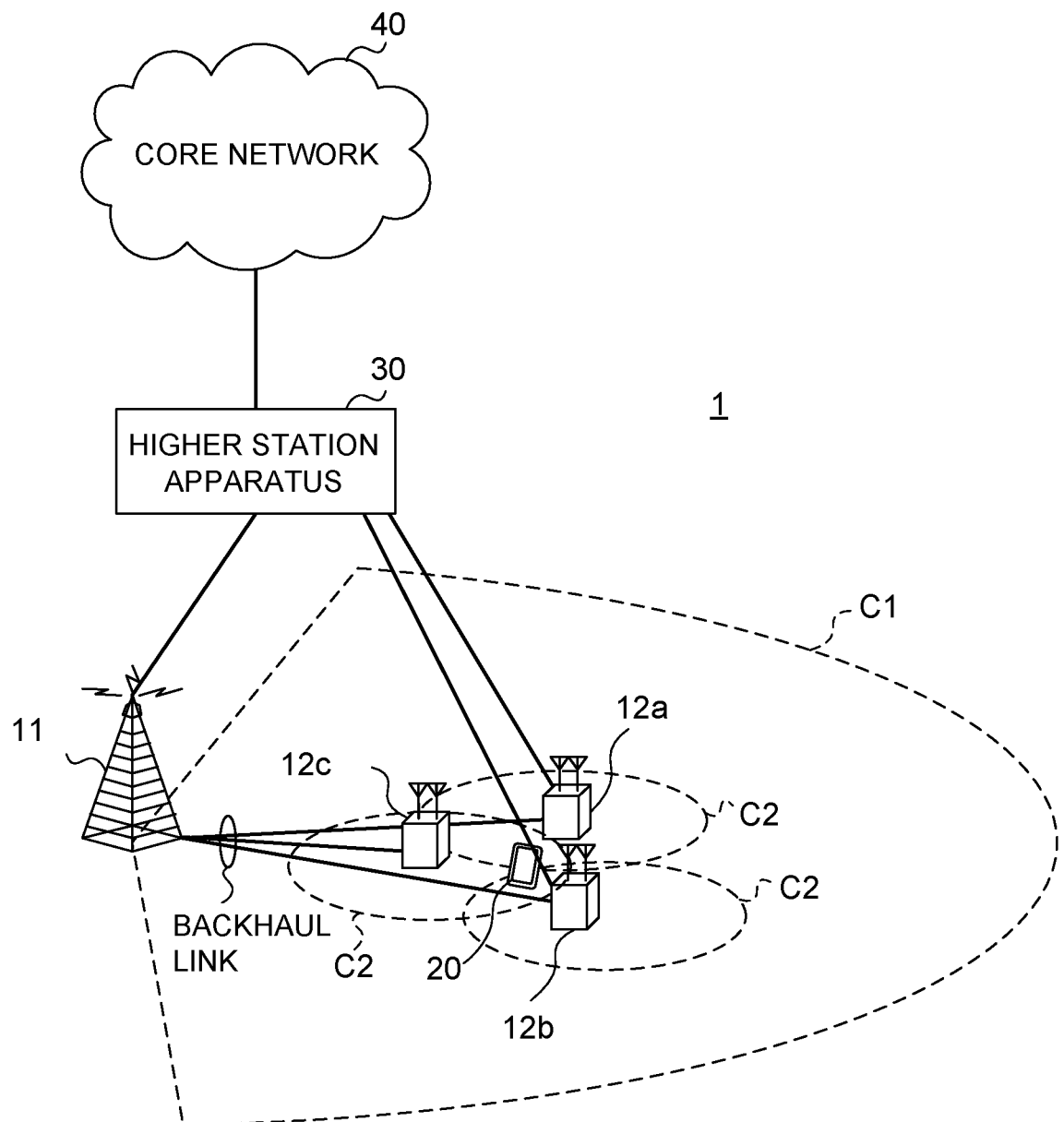
FIG. 8 is a diagram illustrating one example of a schematic configuration of a radio communication system according to the present embodiment.

FIG. 8 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) and the New Radio Access Technology (NR: New-RAT).

The radio communication system 1 illustrated in FIG. 8 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells and/or in a cell.

In addition, the numerology is a communication parameter (e.g., at least one of a spacing of a sub-carrier (sub-carrier spacing), a bandwidth, a symbol length, a CP time duration (CP length), a subframe length, a TTI time duration (TTI length), the number of symbols per TTI, a radio frame configuration, filtering processing and windowing processing) in a frequency direction and/or a time direction. The radio communication system 1 may support sub-carrier spacings such as 15 kHz, 30 kHz, 60 kHz, 120 kHz and 240 kHz.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two or more CCs). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be each referred to as a TDD carrier (frame configuration type 2) and an FDD carrier (frame configuration type 1).

Furthermore, each cell (carrier) may be applied a single numerology or may be applied a plurality of different numerologies.

The user terminal 20 and the radio base station 11 can communicate by using a carrier (also referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB), a gNodeB (gNB) or a transmission/reception point (TRP). Furthermore, each radio base station 12 is a radio base station that has a local coverage, and may be referred to as a small base station, a micro base station, a pico base station, a femto base station, a Home eNodeB (HeNB), a Remote Radio Head (RRH), an eNB, a gNB or a transmission/reception point. The radio base stations 11 and 12 will be collectively referred to as a radio base station 10 below when not distinguished.

Each user terminal 20 is a terminal that supports various communication schemes such as LTE, LTE-A, 5G and NR and may include not only a mobile communication terminal but also a fixed communication terminal. Furthermore, the user terminal 20 can perform Device-to-Device communication (D2D) with the other user terminal 20.

The radio communication system 1 applies Orthogonal Frequency-Division Multiple Access (OFDMA) to downlink (DL) and Single Carrier Frequency Division Multiple Access (SC-FDMA) to uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL.

Furthermore, the radio communication system 1 may use a multicarrier waveform (e.g., OFDM waveform) or may use a single carrier waveform (e.g., DFT-s-OFDM waveform).

The radio communication system 1 uses a DL shared channel (also referred to as a PDSCH: Physical Downlink Shared Channel or a downlink data channel) shared by each user terminal 20, a broadcast channel (PBCH: Physical Broadcast Channel) and an L1/L2 control channel as downlink (DL) channels. User data, higher layer control information and System Information Blocks (SIBs) are conveyed on the PDSCH. Furthermore, Master Information Blocks (MIBs) are conveyed on the PBCH.

The L1/L2 control channel includes downlink control channels (a Physical Downlink Control Channel (PDCCH) and an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. The EPDCCH is subjected to frequency division multiplexing with the PDSCH and is used to convey DCI similar to the PDCCH. Retransmission control information of HARQ (ACK/NACK) for the PUSCH can be conveyed on at least one of the PHICH, the PDCCH and the EPDCCH.

The radio communication system 1 uses an uplink shared channel (also referred to as a PUSCH: Physical Uplink Shared Channel or an uplink data channel) shared by each user terminal 20, an uplink control channel (PUCCH: Physical Uplink Control Channel), and a random access channel (PRACH: Physical Random Access Channel) as uplink (UL) channels. User data and higher layer control information are conveyed on the PUSCH. Uplink Control Information (UCI) including at least one of retransmission control information (A/N) of a downlink (DL) signal and Channel State Information (CSI) is conveyed on the PUSCH or the PUCCH. A random access preamble for establishing connection with a cell can be conveyed on the PRACH.

<Radio Base Station>

Figure 9:
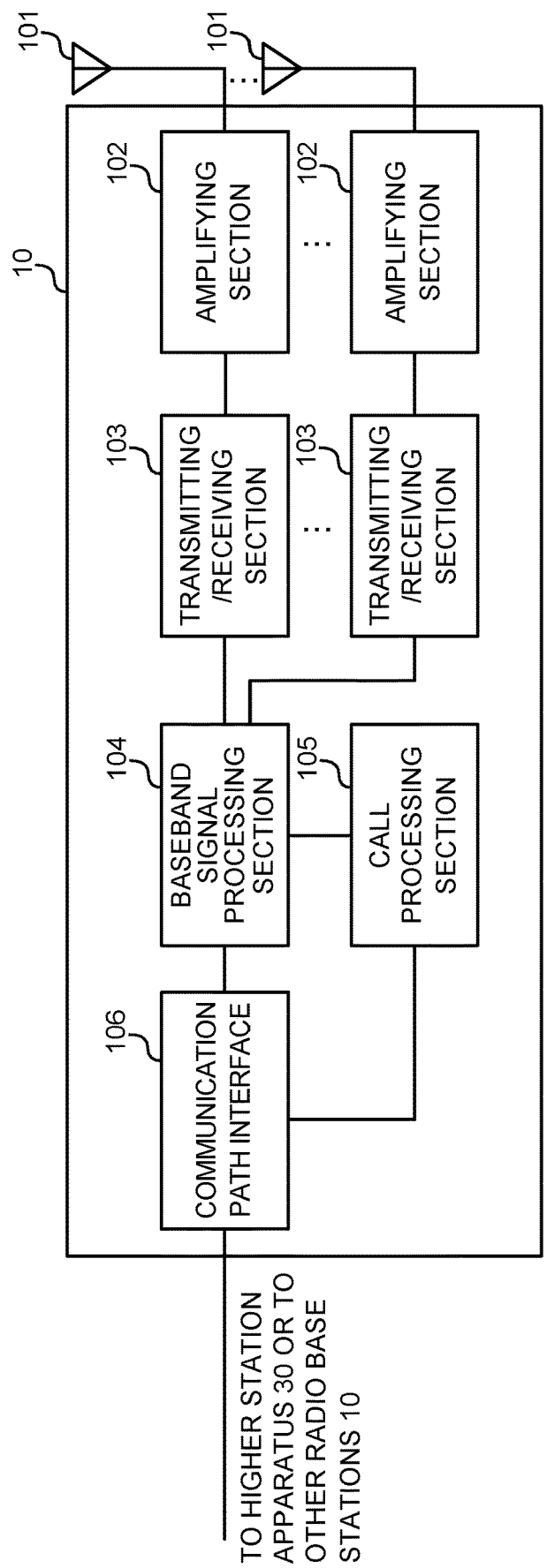
FIG. 9 is a diagram illustrating one example of an overall configuration of a radio base station according to the present embodiment.

FIG. 9 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink (DL) is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARQ) transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink (UL) signal. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmission/reception section 103 transmits the downlink (DL) signal (including at least one of a DL data signal, a DL control signal and a DL reference signal) to the user terminal 20, and receives the uplink (UL) signal (including at least one of a UL data signal, a UL control signal and a UL reference signal) from the user terminal 20.

Furthermore, each transmission/reception section 103 receives the UCI from the user terminal 20 by using an uplink data channel (e.g., PUCCH) or uplink control channels (e.g., a short PUCCH and/or a long PUCCH). The UCI may include at least one of HARQ-ACK of a downlink data channel (e.g., PDSCH), CSI, an SR, beam identification information (e.g., Beam Index (BI)) and a Buffer Status Report (BSR).

Furthermore, each transmission/reception section 103 may transmit control information (e.g., information indicating at least one of a format, an uplink control channel resource, a CSI process, a CSI resource, and a PUCCH associated with the CSI process) related to the uplink control channels (e.g., the short PUCCH and the long PUCCH) by physical layer signaling (L1 signaling) and/or higher layer signaling.

Furthermore, each transmission/reception section 103 may transmit each of information (first encoding information) indicating a code rate for a first uplink control channel (short PUCCH), and information (second encoding information) indicating a code rate for a second uplink control channel (long PUCCH) of a duration longer than that of the first uplink control channel.

Furthermore, each transmission/reception section 103 may transmit information (e.g., the instruction information and/or configuration information) related to fallback.

Figure 10:
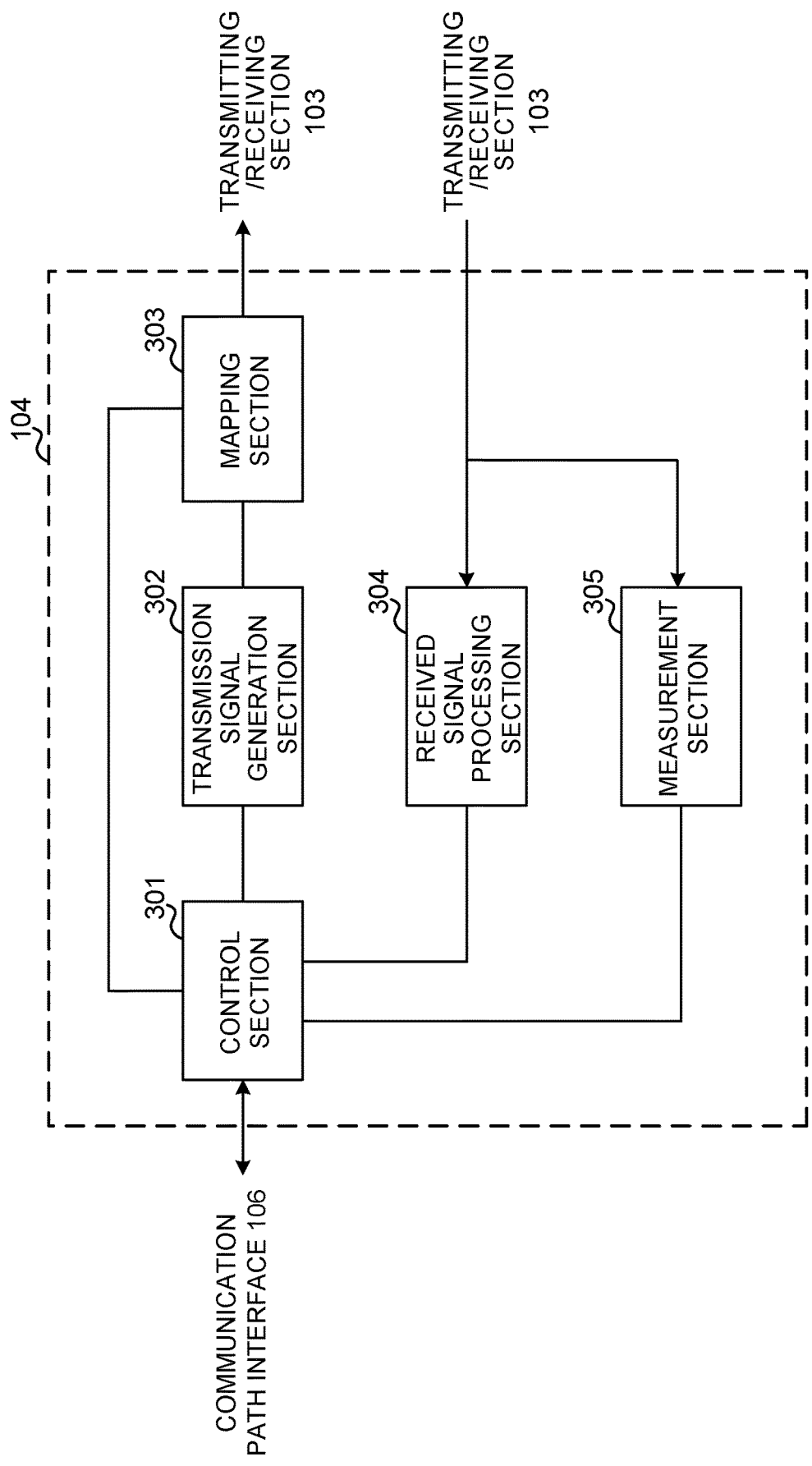
FIG. 10 is a diagram illustrating one example of a function configuration of the radio base station according to the present embodiment.

FIG. 10 is a diagram illustrating one example of a function configuration of the radio base station according to the present embodiment. In addition, FIG. 10 mainly illustrates function blocks of characteristic portions according to the present embodiment, and assumes that the radio base station 10 includes other function blocks, too, that are necessary for radio communication. As illustrated in FIG. 10, the baseband signal processing section 104 includes a control section 301, a transmission signal generating section 302, a mapping section 303, a received signal processing section 304 and a measurement section 305.

The control section 301 controls the entire radio base station 10. The control section 301 controls, for example, DL signal generation of the transmission signal generating section 302, DL signal mapping of the mapping section 303, UL signal reception processing (e.g., demodulation) of the received signal processing section 304, and measurement of the measurement section 305.

More specifically, the control section 301 schedules the user terminal 20. More specifically, the control section 301 may perform scheduling and/or retransmission control on the downlink data channel and/or the uplink data channel based on the UCI (e.g., the CSI and/or the BI) from the user terminal 20.

Furthermore, the control section 301 may control configurations (formats) of the uplink control channels (e.g., the long PUCCH and/or the short PUCCH), and perform control to transmit control information related to the uplink control channels.

Furthermore, the control section 301 may control a code rate (e.g., maximum code rate) of the UCI on the first and second uplink control channels (e.g., the long PUCCH and the short PUCCH), and control transmission of first and second encoding information each indicating this code rate.

Furthermore, the control section 301 may control a PUCCH resource.

The control section 301 may control the received signal processing section 304 to perform reception processing on the UCI from the user terminal 20 based on the format of the uplink control channel.

The control section 301 can be composed of a controller, a control circuit or a control apparatus described based on the common knowledge in the technical field according to the present invention.

The transmission signal generating section 302 generates a DL signal (including a DL data signal, a DL control signal and a DL reference signal) based on an instruction from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on a given radio resource based on the instruction from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (including, for example, a UL data signal, a UL control signal and a UL reference signal) transmitted from the user terminal 20. More specifically, the received signal processing section 304 outputs the received signal and the signal after the reception processing to the measurement section 305. Furthermore, the received signal processing section 304 performs reception processing on the UCI based on the uplink control channel configuration instructed by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of the UL reference signal. The measurement section 305 may output a measurement result to the control section 301.

<User Terminal>

Figure 11:
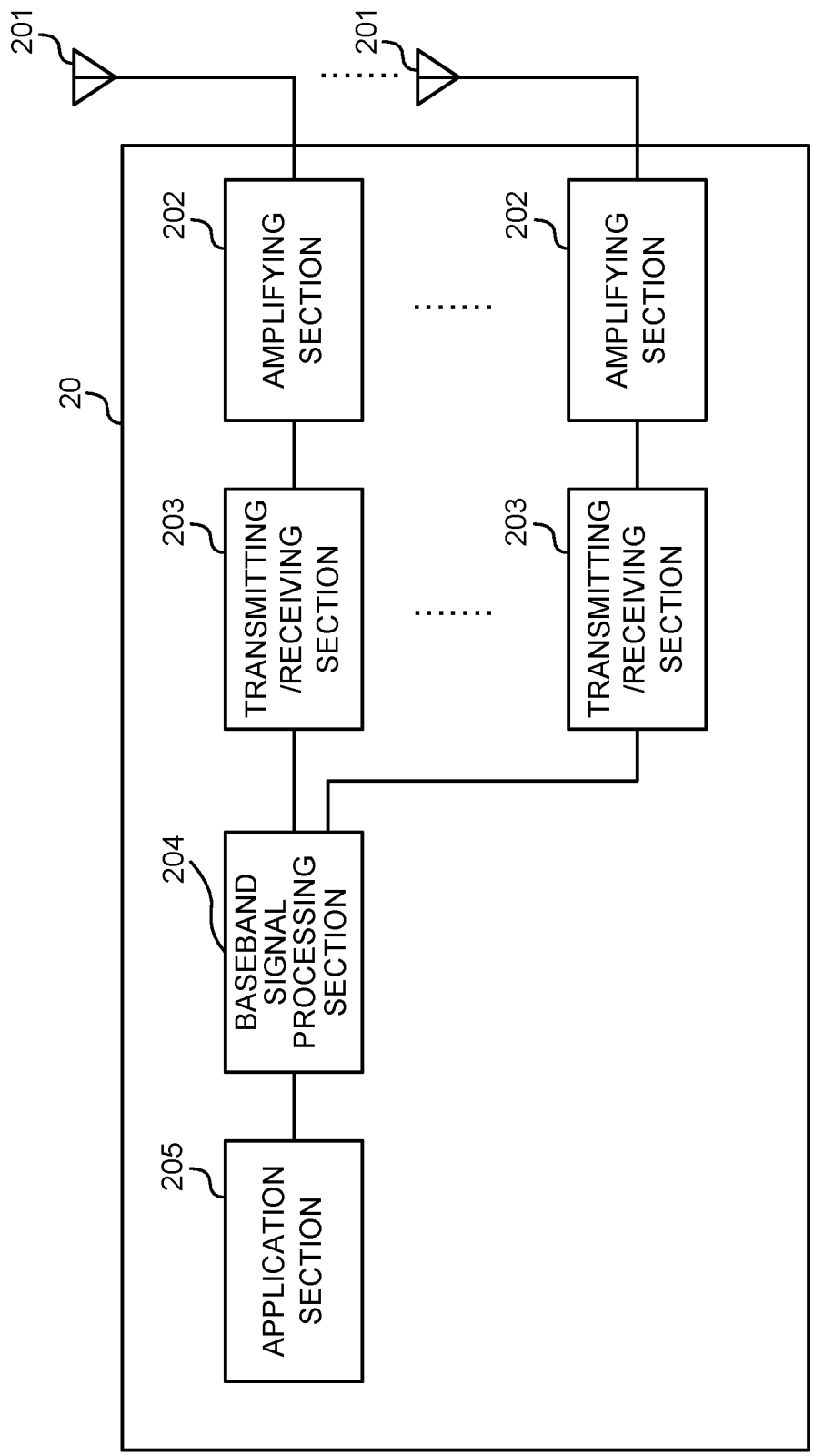
FIG. 11 is a diagram illustrating one example of an overall configuration of a user terminal according to the present embodiment.

FIG. 11 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205.

The amplifying sections 202 amplify radio frequency signals received at a plurality of transmission/reception antennas 201. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding, and reception processing of retransmission control on the input baseband signal. The baseband signal processing section 204 transfers DL data to the application section 205. The application section 205 performs processing related to layers higher than a physical layer and an MAC layer. Furthermore, the baseband signal processing section 204 may transfer broadcast information, too, to the application section 205.

On the other hand, the application section 205 inputs uplink (UL) data to the baseband signal processing section 204. The baseband signal processing section 204 performs transmission processing of retransmission control (e.g., HARQ transmission processing), channel coding, rate matching, puncturing, Discrete Fourier Transform (DFT) processing and IFFT processing on the uplink data, and transfers the uplink data to each transmission/reception section 203. The baseband signal processing section 204 performs at least one of channel coding, rate matching, puncturing, DFT processing and IFFT processing on the UCI, too, and transfers the UCI to each transmission/reception section 203.

Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives the downlink (DL) signal (including the DL data signal, the DL control signal and the DL reference signal) of a numerology configured to the user terminal 20, and receives the UL signal (including the UL data signal, the UL control signal and the UL reference signal) of the numerology.

Furthermore, each transmission/reception section 203 transmits the UCI to the radio base station 10 by using the uplink data channel (e.g., PUCCH) or the uplink control channels (e.g., the short PUCCH and/or the long PUCCH).

Furthermore, each transmission/reception section 203 may receive control information (e.g., information indicating at least one of the format, the uplink control channel resource, the CSI process, the CSI resource and the PUCCH associated with the CSI process) related to the uplink control channels (e.g., the short PUCCH and the long PUCCH) by physical layer signaling (L1 signaling) and/or higher layer signaling.

Furthermore, each transmission/reception section 203 may receive each of the information (first encoding information) indicating the code rate for the first uplink control channel (short PUCCH), and the information (second encoding information) indicating the code rate for the second uplink control channel (long PUCCH) having a longer duration than that of the first uplink control channel.

The transmission/reception sections 203 can be composed as transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 12:
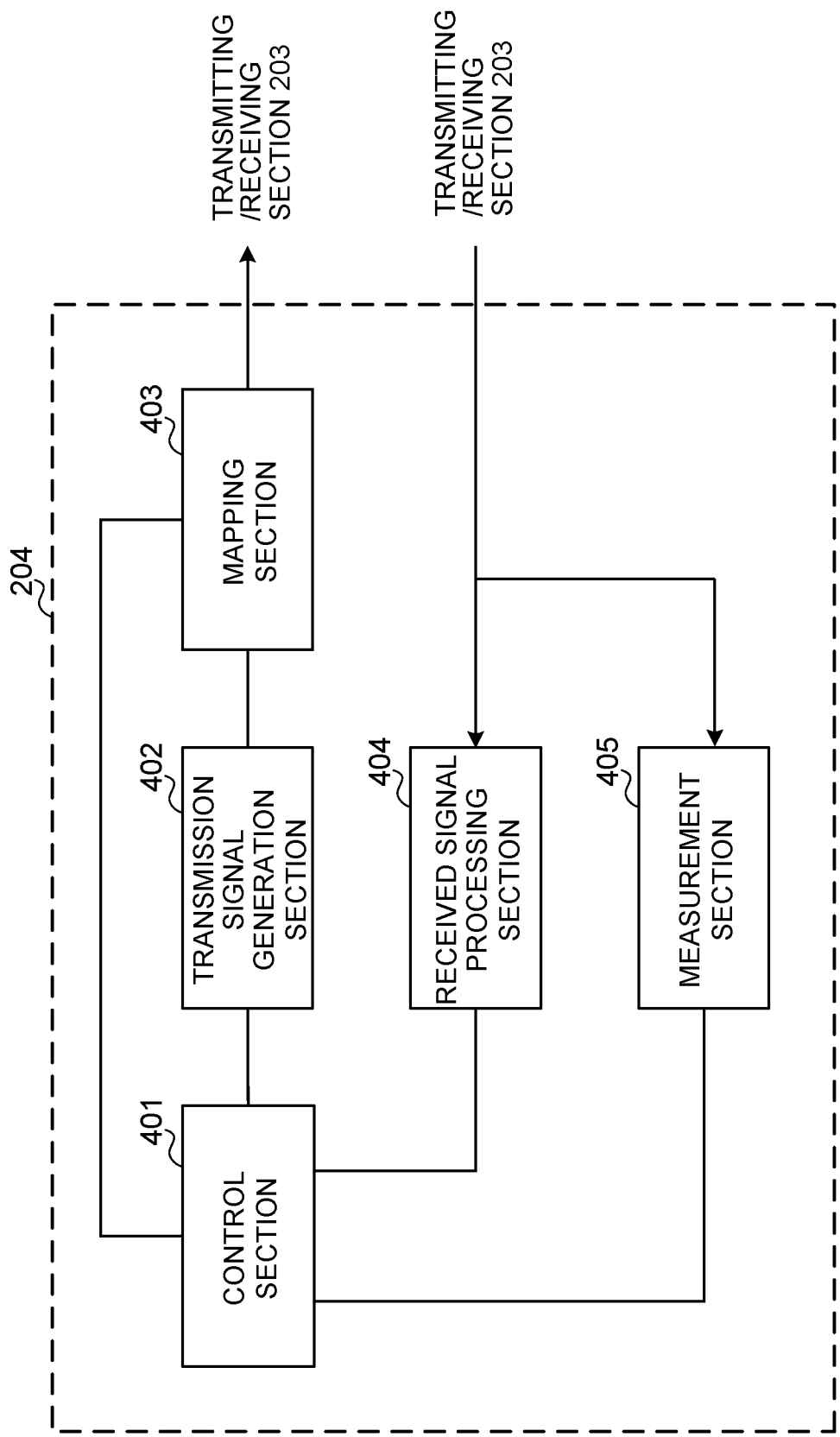
FIG. 12 is a diagram illustrating one example of a function configuration of the user terminal according to the present embodiment.

FIG. 12 is a diagram illustrating one example of a function configuration of the user terminal according to the present embodiment. In addition, FIG. 12 mainly illustrates function blocks of characteristic portions according to the present embodiment, and assumes that the user terminal 20 includes other function blocks, too, that are necessary for radio communication. As illustrated in FIG. 12, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls, for example, UL signal generation of the transmission signal generating section 402, UL signal mapping of the mapping section 403, DL signal reception processing of the received signal processing section 404, and measurement of the measurement section 405.

Furthermore, the control section 401 controls the uplink control channel used for transmission of the UCI from the user terminal 20 based on an explicit instruction from the radio base station 10 or explicit determination of the user terminal 20.

Furthermore, the control section 401 may control the configurations (formats) of the uplink control channels (e.g., the long PUCCH and/or the short PUCCH). The control section 401 may control the formats of the uplink control channels based on control information from the radio base station 10.

Furthermore, the control section 401 may control transmission of the UCI based on the code rate indicating the encoding information (e.g., the first or second encoding information) matching the uplink control channel used for transmission of the UCI.

Furthermore, the control section 401 may control dropping of at least part of the UCI on at least one of the first uplink control channel and the second uplink control channel when the first uplink control channel (short PUCCH) and the second uplink control channel (long PUCCH) are subjected to time division multiplexing (FIG. 4).

Furthermore, the control section 401 may control transmission of the UCI based on the code rate associated with (a value equal to) the encoding information matching the uplink control channel used for the transmission of the UCI in a table that associates given values and the code rates (FIGS. 5 to 7).

The code rates associated with the given values in the table may be common or different between the first uplink control channel and the second uplink control channel (FIG. 5).

A size of the table that associates the given values and the code rates may be common or different between the first uplink control channel and the second uplink control channel (FIG. 6).

The table that associates the given values and the code rates may be common or different between the first uplink control channel and the second uplink control channel (FIG. 7).

Furthermore, the control section 401 may control transmission and/or dropping of at least part of the CSI included in the UCI. Each process of the CSI may be associated with the first uplink control channel or the second uplink control channel by higher layer signaling.

Furthermore, the control section 401 may determine the PUCCH resource used by the PUCCH format based on higher layer signaling and/or downlink control information.

The control section 401 may control at least one of the transmission signal generating section 402, the mapping section 403 and each transmission/reception section 203 to perform transmission processing on the UCI based on the PUCCH format.

The control section 401 can be composed of a controller, a control circuit or a control apparatus described based on the common knowledge in the technical field according to the present invention.

The transmission signal generating section 402 generates (e.g., encodes, rate-matches, punctures or modulates) a UL signal (including a UL data signal, a UL control signal, a UL reference signal and UCI) based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on a radio resource based on the instruction from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (a DL data signal, scheduling information, a DL control signal or a DL reference signal). The received signal processing section 404 outputs information received from the radio base station 10 to the control section 401. The received signal processing section 404 outputs, for example, broadcast information, system information, higher layer control information of higher layer signaling such as RRC signaling and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 13:
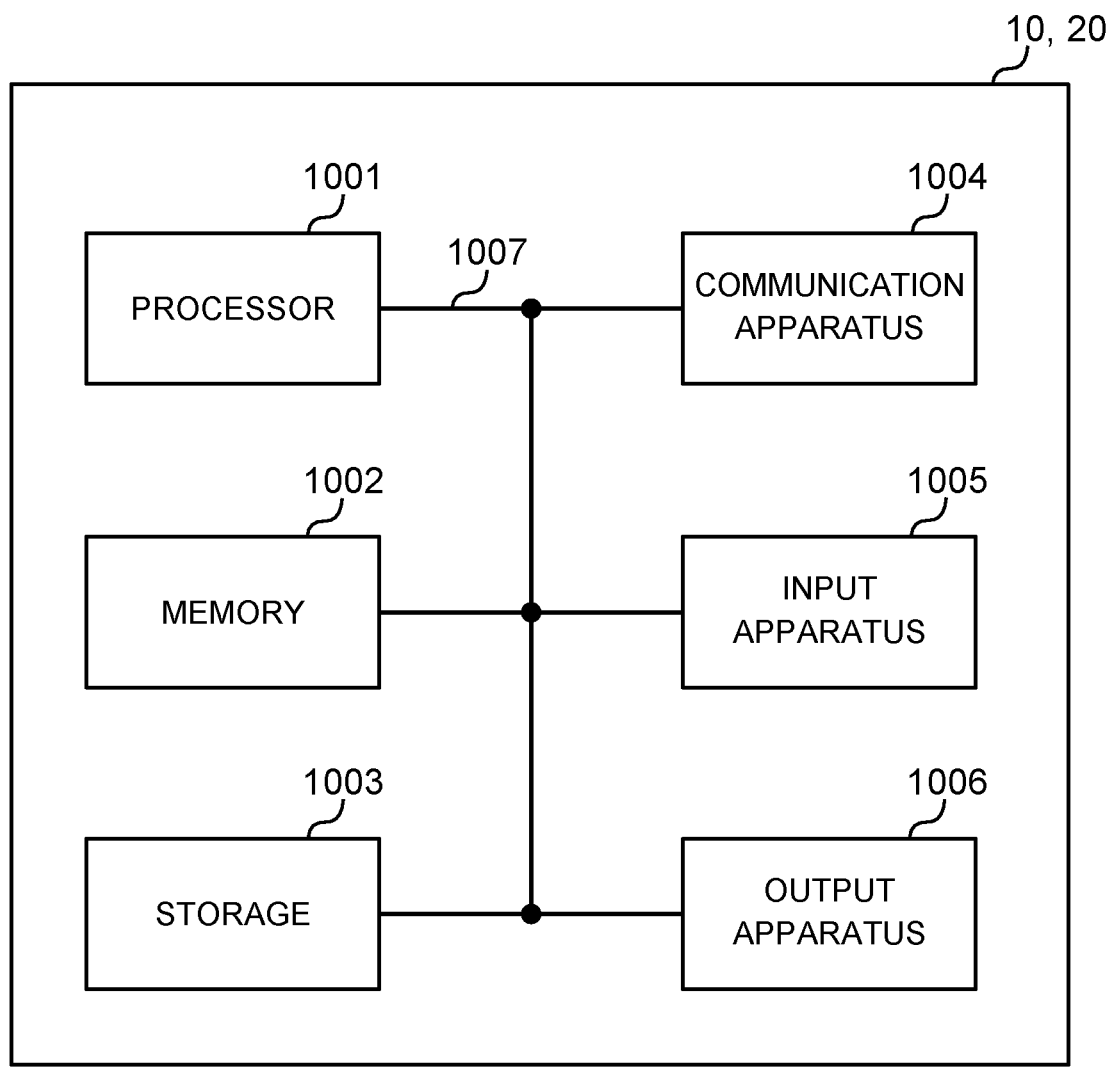
FIG. 13 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 13 is a diagram illustrating one example of the hardware configurations of the radio base station and the user terminal according to the present embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by one processor or processing may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using a bus that is different per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

MODIFIED EXAMPLE

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description can be compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a transmission/reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

The base station and/or the mobile station may be referred to as a transmission apparatus or a reception apparatus.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of the physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description intends for exemplary explanation, and does not bring any restrictive meaning to the present invention.

The invention claimed is:

1. A terminal comprising:
   a receiver that receives an information element comprising a first information indicating a first maximum coding rate for a first uplink control channel format and a second information indicating a second maximum coding rate for a second uplink control channel format, the second uplink control channel format having a longer duration than that of the first uplink control channel format; and
   a processor that controls a transmission of an uplink control information based on the first information or based on the second information,
   wherein the first maximum coding rate is indicated by a first encoding information of values 0 to 6 of the first information, and the second maximum coding rate is indicated by a second encoding information of values 0 to 6 of the second information.

2. The terminal according to claim 1, wherein the processor determines a first coding rate based on an association between the first information and the first coding rate, and/or a second coding rate based on an association between the second information and the second coding rate.

3. The terminal according to claim 1, wherein the uplink control information includes a Hybrid Automatic Repeat reQuest-Acknowledgement (HARQ-ACK) information, a scheduling request, or a channel state information for a downlink data channel.

4. The terminal according to claim 1, wherein the receiver receives the first information and the second information via higher layer signaling.

5. The terminal according to claim 1, wherein the first uplink control channel format is PUCCH format 2 and the second uplink control channel format is a PUCCH format 3 or a PUCCH format 4.

6. The terminal according to claim 1, wherein the processor determines an uplink control channel format to use for the transmission of the uplink control information and controls the transmission of the uplink control information based on a code rate indicated by the first information or the second information matching the uplink control channel format determined by the processor.

7. A radio communication method performed by a terminal, the method comprising:
   receiving an information element comprising a first information indicating a first maximum coding rate for a first uplink control channel format and a second information indicating a second maximum coding rate for a second uplink control channel format, the second uplink control channel format having a longer duration than that of the first uplink control channel format; and
   controlling a transmission of an uplink control information based on the first information or based on the second information,
   wherein the first maximum coding rate is indicated by a first encoding information of values 0 to 6 of the first information, and the second maximum coding rate is indicated by a second encoding information of values 0 to 6 of the second information.

8. A radio base station comprising:
   a transceiver that transmits an information element comprising a first information indicating a first maximum coding rate for a first uplink control channel format and a second information indicating a second maximum coding rate for a second uplink control channel format, the second uplink control channel format having a longer duration than that of the first uplink control channel format; and
   a receiver that receives an uplink control information transmitted from a terminal based on the first information or based on the second information,
   wherein the first maximum coding rate is indicated by a first encoding information of values 0 to 6 of the first information, and the second maximum coding rate is indicated by a second encoding information of values 0 to 6 of the second information.

9. The terminal according to claim 2, wherein the uplink control information includes a Hybrid Automatic Repeat reQuest-Acknowledgement (HARQ-ACK) information, a scheduling request, or a channel state information for a downlink data channel.

10. The terminal according to claim 2, wherein the receiver receives the first information and the second information via higher layer signaling.

11. The terminal according to claim 3, wherein the receiver receives the first information and the second information via higher layer signaling.

12. The terminal according to claim 2, wherein the first uplink control channel format is a Physical Uplink Control Channel (PUCCH) format 2 and the second uplink control channel format is a PUCCH format 3 or a PUCCH format 4.

13. The terminal according to claim 3, wherein the first uplink control channel format is a Physical Uplink Control Channel (PUCCH) format 2 and the second uplink control channel format is a PUCCH format 3 or a PUCCH format 4.

14. The terminal according to claim 4, wherein the first uplink control channel format is a Physical Uplink Control Channel (PUCCH) format 2 and the second uplink control channel format is a PUCCH format 3 or a PUCCH format 4.

15. The terminal according to claim 1, wherein the processor controls a transmission of the uplink control information via an uplink control channel using at least one of the first uplink control channel format and the second uplink control channel format according to a type of the uplink control information to be transmitted.

* * * * *